United States Patent
Chin et al.

(10) Patent No.: US 6,643,421 B1
(45) Date of Patent: Nov. 4, 2003

(54) WAVELENGTH-SLICING ARCHITECTURE FOR WAVELENGTH DEMULTIPLEXING USING MICRO-RING RESONATORS

(75) Inventors: Mee Koy Chin, Wilmette, IL (US); Jose L. Jimenez, Ann Arbor, MI (US)

(73) Assignee: LNL Technologies, Inc., Cambridge, MA (US)

( * ) Notice: Subject to any disclaimer, the term of this patent is extended or adjusted under 35 U.S.C. 154(b) by 392 days.

(21) Appl. No.: 09/666,811

(22) Filed: Sep. 21, 2000

Related U.S. Application Data

(60) Provisional application No. 60/155,307, filed on Sep. 21, 1999.

(51) Int. Cl.[7] .............................. G02B 6/26; G02B 6/293
(52) U.S. Cl. .............................. 385/15; 385/24; 398/82
(58) Field of Search .............................. 385/15, 24, 27, 385/30, 39, 42, 48, 50; 359/127

(56) References Cited

U.S. PATENT DOCUMENTS

| | | | | |
|---|---|---|---|---|
| 4,720,160 A | * | 1/1988 | Hicks, Jr. ..................... | 385/31 |
| 5,926,496 A | * | 7/1999 | Ho et al. ..................... | 372/92 |
| 6,009,115 A | * | 12/1999 | Ho ............................. | 372/92 |
| 6,101,300 A | * | 8/2000 | Fan et al. ..................... | 385/27 |
| 6,130,969 A | * | 10/2000 | Villeneuve et al. ........... | 385/27 |
| 6,411,752 B1 | * | 6/2002 | Little et al. .................... | 385/17 |

OTHER PUBLICATIONS

A. Melloni et al, "Synthesis of direct–coupled–resonators bandpass photonic filters", IEEE Lasers and Electro–Optics Society 13th Annual Meeting (LEOS 2000), Rio Grande, PR, Nov. 13–16, 2000, Paper ThC4, vol 2, pp 704–705.*
A. Melloni et al, "Synthesis of Direct–Coupled–Resonators Bandpass Filters for WDM Systems", Journal of Lightwave Technology, vol. 20, no 2, Feb. 2002, pp 296–303.*

* cited by examiner

*Primary Examiner*—John D. Lee
(74) *Attorney, Agent, or Firm*—Edwards & Angell, LLP

(57) ABSTRACT

A device is provided for demultiplexing a DWDM composite light signal into distinct signal channels or frequencies. The device includes a plurality of resonators, which each acts to slice an incoming signal into two equal parts. The free spectral range characteristics (FSR) of the resonators are successively increased by an even multiple to achieve the slicing effect. As a result, the resonators of the subject invention can be formed with relatively low finesse values because of the slicing effect.

15 Claims, 5 Drawing Sheets

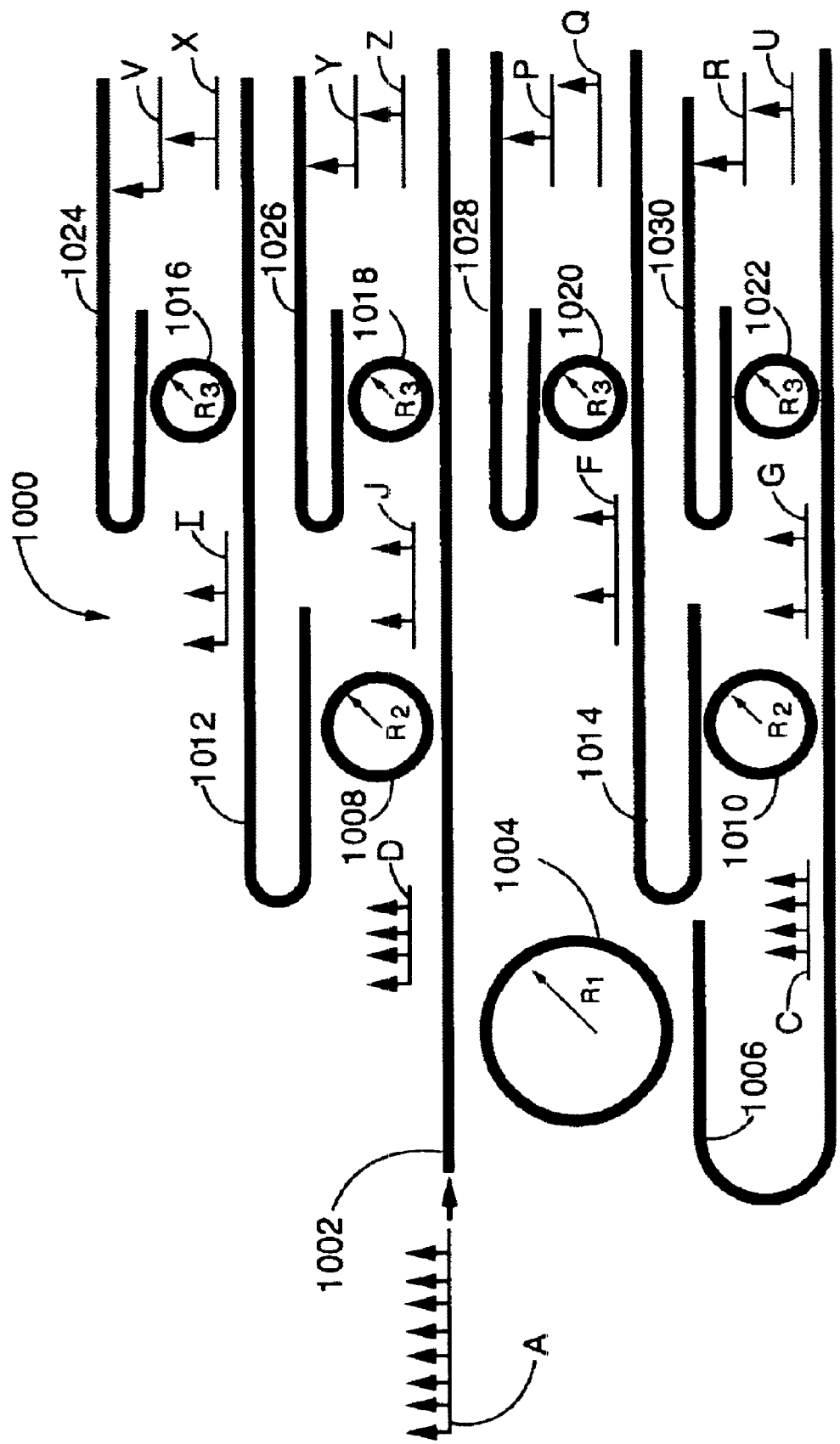

WAVELENGTH-SLICING ARCHITECTURE FOR WAVELENGTH DEMULTIPLEXING USING MICRO-RING RESONATORS

CROSS-REFERENCE TO RELATED APPLICATION

This application claims priority to Provisional Patent Application No. 60/155,307, filed on Sep. 21, 1999.

FIELD OF THE INVENTION

This invention relates to nanophotonic devices, and, more particularly, to optical resonator devices used in demultiplexing devices.

BACKGROUND OF INVENTION

Wave-division multiplexing (WDM), and similarly, dense WDM (DWDM) and ultra-dense WDM (UDWDM), provide the ability to simultaneously transmit multiple signals through a single optical fiber or waveguide, with each signal being transmitted on a separate wavelength or channel and each typically carrying either 2.5 or 10-gigabit-per-second signals.

The International Telecommunications Union (ITU) has set standards for the basic wavelength and channel spacing used in WDM. Light, like radio waves has a wavelength. For light this is measured in nanometers (millionths of a millimeter). The ITU standards set a "window" from 1500 nm to 1535 nm for WDM, subdivided into 43 "channels", sometimes referred to as "colors", whose centers are separated by 0.8 nm. This represents a channel bandwidth of about 100 GHz regarded as the current practical limit for manufacturing precision tunable optical transceivers. In future, however, the channel spacing will be halved to provide up to 80 channels per fiber.

In practice, each channel can be treated as an independent optical transmission path and therefore can be modulated at whatever speed is appropriate for an application. A hierarchy of optical fiber transmission speeds has been standardized for the two major optical network systems—Synchronous Optical NETwork (SONET) in the US, and the ITU's standard Synchronous Digital Hierarchy (SDH) in the rest of the world. There are differences between the terminology and the details of hierarchy of speeds but the standards are not completely incompatible.

DWDM combines multiple optical signals so that they can be amplified as a group and transported over a single fiber or waveguide to increase capacity. Each signal carried can be at a different rate (OC-3/12/24, etc.) and in a different format (SONET, ATM, data, etc.) For example, a DWDM network with a mix of SONET signals operating at OC-48 (2.5 Gbps) and OC-192 (10 Gbps) over a DWDM infrastructure can achieve capacities of over 40 Gbps. A system with DWDM can achieve all this gracefully while maintaining the same degree of system performance, reliability, and robustness as current transport systems—or even surpassing it. Future DWDM terminals will carry up to 80 wavelengths of OC-48, a total of 200 Gbps, or up to 40 wavelengths of OC-192, a total of 400 Gbps—which is enough capacity to transmit 90,000 volumes of an encyclopedia in one second.

Micro-ring resonators are known in the prior art, such as that disclosed in U.S. Pat. No. 5,926,496. In addition, it is known in the prior art to use micro-ring resonators as filters, wherein the resonators act to separate desired wavelengths (i.e., channels) of a light signal from a DWDM input light signal. For example, FIG. 1 depicts a prior art filter arrangement 1 having an input waveguide 2, with an input port 3 and an output port 4, and an output waveguide 5, with an output port 6. A micro-ring resonator 7 is interposed between the input waveguide 2 and the output waveguide 5 and is tuned to a predetermined wavelength. To understand the operation of the filter 1, with a DWDM light signal propagating through the input waveguide 2 (in a direction from the input port 3 and towards the output port 4), part of the light signal (i.e., the wavelength of the input signal that is on-resonance with the resonator 7) will couple from the input waveguide to the resonator 7. That wavelength is thus demultiplexed or dropped from the input signal. The resonator 7, in turn, couples that wavelength to the output waveguide 5 and a light signal having that particular wavelength propagate through the output waveguide 5 towards the output port 6. The remaining wavelengths of the input signal, i.e., those which are not on-resonance with the resonator 7, by-pass the resonator 7 and continue propagating through the input waveguide 2 and towards the output port 4.

Using this basic methodology, full-scale demultiplexing systems have been built for lightwave systems. With reference to FIG. 2, a demultiplexing device 10 is shown having a single input waveguide 11, with an input port 12 and an output port 13. A series of micro-ring resonators 14A–D are arranged along the length of the input waveguide 11. Although not shown in FIG. 2, the resonators 14A–D would generally be each formed with a different radius; with the radius of the resonator determining, at least in part, the resonant wavelength of the resonator. Additionally, an output waveguide 15A–D is provided for each resonator 14A–D, with each output waveguide 15A–D having an output port 16A–D. The demultiplexing device 10 is referred to as a 1×5 device: the first number (1) signifying a single input, while the second number signifies the number of outputs (5). Other combinations are possible, including 1×8 and 1×16. With the structural arrangement of the device 10, a DWDM light signal propagating through the input waveguide 11, in a direction from the input port 12 and towards the output port 13, will be sequentially demultiplexed (also known as "demuxed") by the resonators 14A–D into four different wavelengths, with a remainder signal portion (i.e., those wavelengths that are not demuxed) propagating through the input waveguide 11. The various wavelengths will respectively propagate towards the output ports 13 and 16A–D.

With reference to FIG. 3, a chart is provided to symbolically represent the coupling of wavelengths of a light signal by a resonator. The arrows along line A' represent different light signal wavelengths or channels LS. Trapezoidal blocks T on line B' represents the transfer characteristic of a resonator, such as resonator 7 (FIG. 3). With the DWM light signal having a plurality of wavelengths or channels propagating through input waveguide 2, the wavelengths or channels LS that coincide with the trapezoidal blocks T are coupled to the resonator 7, as represented by coupled wavelengths or channels CLS shown on line C' in FIG. 3. Wavelengths that are not coincident with the trapezoidal blocks T by-pass the resonator 7 and continue to propagate through (or are guided by) the input waveguide 2, as depicted on line D' and identified as SLS.

The spacing S between the trapezoidal blocks T is a free spectral range (FSR) characteristic of the resonator 7, whereas, the full-width half-maximum (FWHM) width W of the trapezoidal blocks T is indicative of the linewidth of the resonator 7. In addition, the finesse F of a resonator is equal to the FSR/linewidth. As can be appreciated, a narrow linewidth will result in a large finesse F, while a large linewidth will result in a small finesse F.

Although effective, the system of FIG. 2 has limitations. Each of the resonators 14A–D requires a narrow linewidth to only select a specific wavelength of the input signal. Where a large number of wavelengths are required to be demultiplexed, the finesse of the resonators 14A–D will be relatively high, thereby requiring relatively stringent tolerances, finer tunability, etc., and high manufacturing standards.

Thus, there exists a need in the art for an optical device that overcomes the above-described shortcomings of the prior art.

SUMMARY OF THE INVENTION

The subject invention overcomes the deficiencies of the prior art, wherein a demultiplexing device is provided for selectively demultiplexing wavelengths or channels of a DWDM light signal. The device includes a plurality of resonators, preferably micro-ring, which are arranged to "slice" a signal into wavelengths or channels (those terms being used interchangeably herein), rather than couple desired wavelengths. By "slicing" the signal in sequential steps, the resonators can each be formed with a lower finesse than resonators arranged in a prior art device. Prior art demultiplexing devices using resonators typically include a plurality of resonators arranged in a generally linear and cascaded array. All the resonators are required to have a finesse that is proportional to the number of wavelengths in the DWDM signal. For very broadband DWDM signals (high channel count), the required FSR is also proportionally larger, which means that the resonators will be very small.

With the subject invention, a plurality of resonators having different physical and optical characteristics are optically coupled to a plurality of waveguides, thus defining a plurality of stages. In each stage, the number of channels in the DWDM signal is reduced by two (or by 2N, an even number). Thus, the architecture of the present invention may also be referred to as a divide-by-2N architecture. After the first resonator stage, the DWDM signals will have been separated into even-number and odd number channels, with half of the channels being dropped by the first resonator. The other half will continue through the input waveguide, having by-passed the resonator.

Thereafter (i.e., in subsequent, downstream stages), a plurality of resonators are utilized to continue slicing, until single wavelength or channel light signals remain. It should be noted that the same number of resonators will generally be required for the subject invention as in a prior art demultiplexer. However, the resonators that are required can be of a much lower finesse than that of the resonators used in the prior art. In addition, the resonators will generally be arranged in parallel, thereby, cutting down the distance signals must propagate.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference numerals depict like elements throughout the several views:

FIG. 4 is a top plan view of a demultiplexer formed in accordance with the subject invention that spatially separates eight wavelength channels that constitute the DWDM input signal;

DETAILED DESCRIPTION OF THE PREFERRED EMBODIMENTS

Referring to FIG. 4, a device 1000 for demultiplexing a DWDM input light signal is shown. The device 1000 generally includes an input waveguide 1002, a first resonator 1004, a connecting waveguide 1006, two secondary resonators 1008, 1010, two secondary waveguides 1012, 1014, four tertiary resonators 1016, 1018, 1020, 1022, and four tertiary waveguides 1024, 1026, 1028, 1030. Preferably, all resonators are micro-ring resonators.

The device 1000 is shown for use in a 1×8 demultiplexing application. It is to be understood that this description of the device 1000 is provided to illustrate the structure and functioning of the subject invention, and the subject invention is not limited to 1×8 applications. Other applications are possible, such as 1×16 demultiplexing applications, consistent with the teachings herein.

In a preferred embodiment, the FSR of the first resonator 1004 is equal to two times the channel spacing of the DWDM input signal. In this manner, the first resonator 1004 couples half the wavelengths propagating through the input waveguide 1002. To demonstrate the subject invention, FIGS. 4 and 5A–G depict arrows, with each arrow representing a particular wavelength or channel of the DWDM signal. As indicated above, the device 1000 is shown to be a 1×8 demultiplexer; therefore, as represented by line A in FIGS. 4 and 5A, an original input signal having eight channels is directed into the input waveguide 1002. The first resonator 1004 has transfer characteristics as represented by line B in FIG. 5A, with the four signal channels represented in line C being coincident with the transfer characteristics and coupled to the connecting waveguide 1006 by the first resonator 1004. The four signal channels represented by line D by-pass the first resonator 1004 and continue through the input waveguide 1002. As can be appreciated, the first resonator 1004 acts to slice the original input signal into two halves, with each half having the same number of generally evenly-spaced wavelengths or channels.

Figure 1:
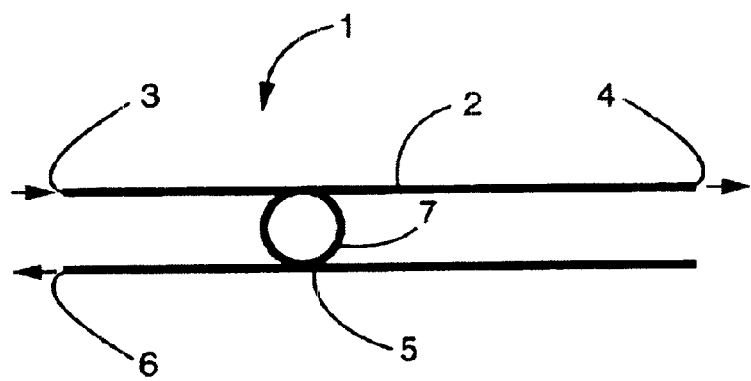
FIG. 1 is a top plan view of a prior art optical filter having input and output waveguides and a resonator optically coupled therebetween.
Figure 2:
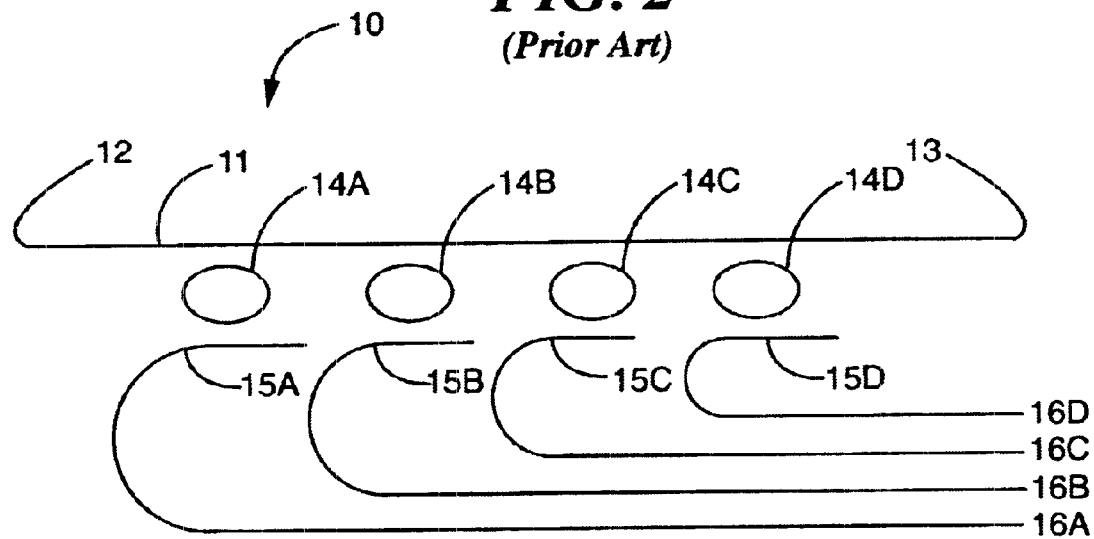
FIG. 2 is a top plan view of a prior art optical demultiplexer device.
Figure 3:
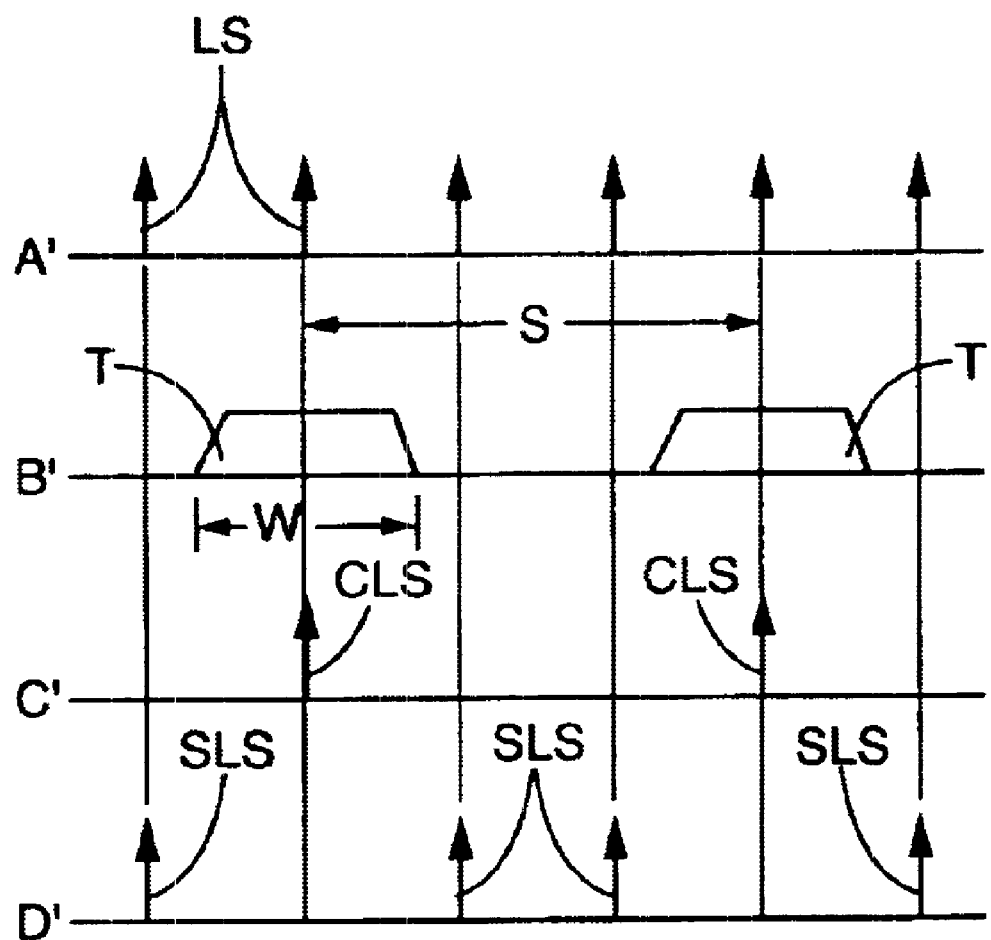
FIG. 3 is a schematic representing transfer characteristics of a typical optical resonator.
Figure 5A:
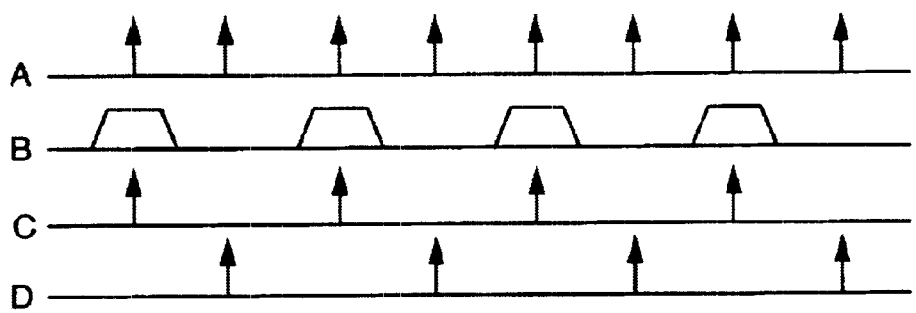
FIGS. 5A–G are schematics representing various transfer characteristics of the resonators depicted in FIG. 4.
Figure 5B:
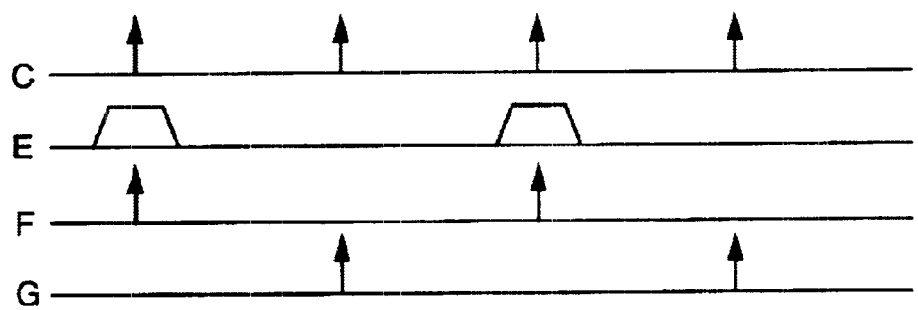
Figure 5C:
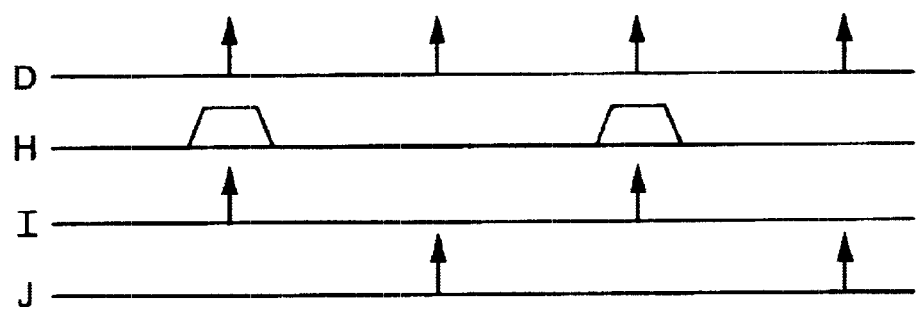
Figure 5D:
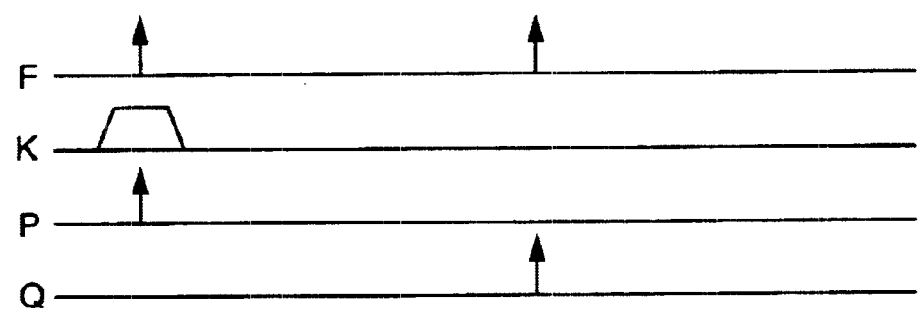
Figure 5E:
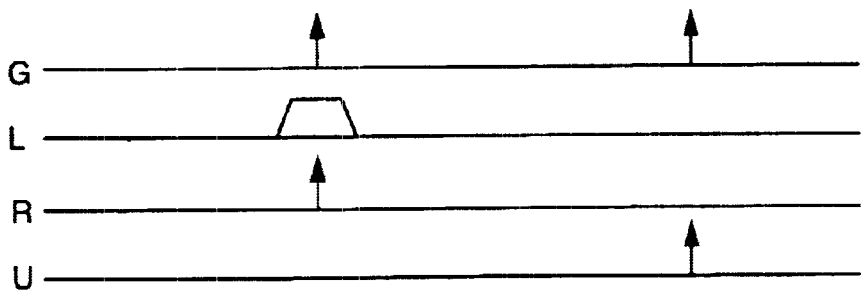
Figure 5F:
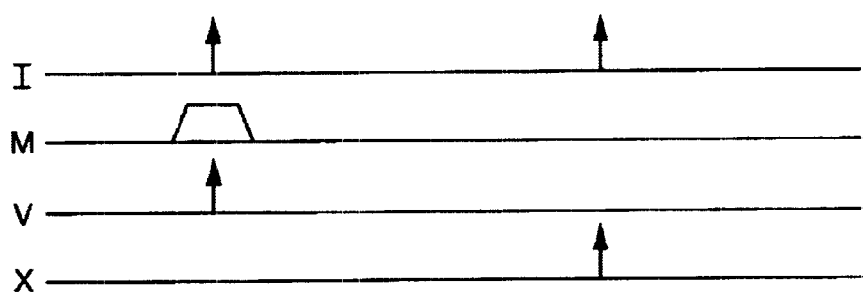
Figure 5G:
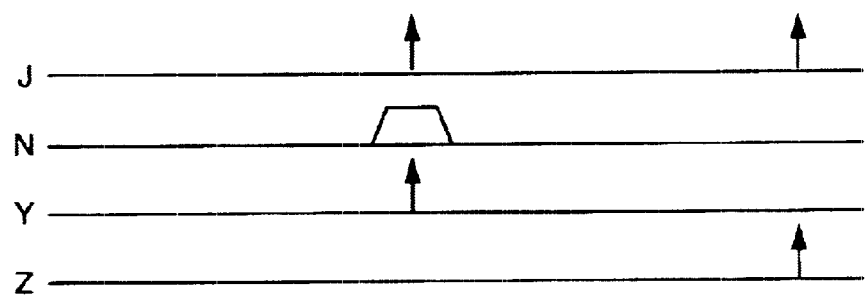

In turn, the coupled channels represented by line C propagate through the connecting waveguide 1006 and into proximity with the secondary resonator 1010. As represented in FIG. 5B, the channels of the light signal coinciding with the transfer characteristics of the secondary resonator 1010, represented by line E, are coupled to the secondary waveguide 1014. The coupled channels are represented by line F, whereas the channels by-passing the secondary resonator 1010 are represented by the line G.

In similar fashion, the secondary resonator 1008, having transfer characteristics represented by line H, causes the channels represented by line 1 to be coupled to the secondary waveguide 1012. The channels represented by line J by-pass the secondary resonator 1008.

In a preferred embodiment, the secondary resonators 1008, 1010 have FSR characteristics which are an even multiple (i.e., n times, with n being an integer) of the FSR of the first resonator 1004. More preferably, the FSR characteristics of the secondary resonators 1008, 1010 are two times the FSR of the first resonator 1004. This relationship between FSR (in wavelength units) and resonator radius is given by:

$$FSR = \frac{\lambda_m^2}{2\pi R n_{eff}} \quad (1)$$

where $n_{eff}$ is the effective refractive index of the waveguide (i.e., the resonator waveguide) and is approximately equal to 3, and $\lambda_m$ is the center wavelength (e.g., 1.55 microns or 1550 nm). FSR may be expressed in frequency or in wavelength units according to the following relationship: 100 GHz=0.8 nm, 200 GHz=1.6 nm, etc. Thus, for FSR of 100 GHz, the resonator radius R will be equal to 160 microns. Likewise, for FSR of 200 and 400 GHz, the resonator radius will be equal to 80 and 40 microns, respectively. As the FSR increases from an earlier stage to a later stage, so does the linewidth. As adjacent channels are filtered out, the linewidth required can be relaxed. In fact, the ratio of FSR over linewidth, i.e., the finesse, will remain constant at a relatively low value.

In a preferred embodiment, the radius R1 will be two times the radius R2 of the secondary resonators 1008, 1010, since it is desired that the FSR characteristics of the secondary resonators 1008, 1010 be two times the FSR of the first resonator 1004. As known by those skilled in the art, the size of the FSR characteristics of a micro-ring resonator is inversely proportional to the radius of the resonator.

The tertiary resonators 1016, 1018, 1020, 1022 work in similar fashion to the secondary resonators 1008, 1010, in slicing wavelengths or channels. The tertiary resonators 1016, 1018, 1020, 1022 have transfer characteristics represented respectively by lines K, L, M, N. As a result, the channels represented by line V are coupled to the tertiary waveguide 1024; the channels represented by line Y are coupled to the tertiary waveguide 1026; the channels represented by line P are coupled to the tertiary waveguide 1028; and the channels represented by line R are coupled to the tertiary waveguide 1030. Additionally, the channels represented by line X by-pass the tertiary resonator 1016 to continue propagating through the secondary waveguide 1012; the channels represented by line Z by-pass the tertiary resonator 1018 to continue propagating through the input waveguide 1002; the channels represented by line Q by-pass the tertiary resonator 1020 to continue propagating through the secondary waveguide 1014; and, the channels represented by line U by-pass the tertiary resonator 1022 to continue propagating through the connecting waveguide 1006. As a net result, eight distinct channels are separated from the DWDM input signal represented by the line A.

Preferably, the tertiary resonators 1016, 1018, 1020, 1022 are each, respectively, formed to have a FSR which is two times the FSR of the secondary resonators 1008, 1010. As such the radius R2 of the secondary resonators 1008, 1010 is two times the radius R3 of the tertiary resonators 1016, 1018, 1020, 1022. Alternatively, the FSR characteristics of the tertiary resonators can be other even multiples of the FSR characteristics of the secondary resonators.

To further describe the preferred embodiment of the invention, the following is an exemplary embodiment. With an input signal having a 50 GHz channel spacing, the FSR of the first resonator 1004 will be 100 GHz. Accordingly, the FSR of the secondary resonators 1008, 1010 will be 200 GHz, while that of the tertiary resonators 1016, 1018, 1020, 1022 will be 400 GHz. Meanwhile, the radius R1 of the first resonator 1004 may be 160 microns, the radius R2 of the secondary resonators 1008, 1010 may be 80 microns, and the radius R3 of the tertiary resonators 1016, 1018, 1020, 1022 will be 40 microns.

Figure 6:
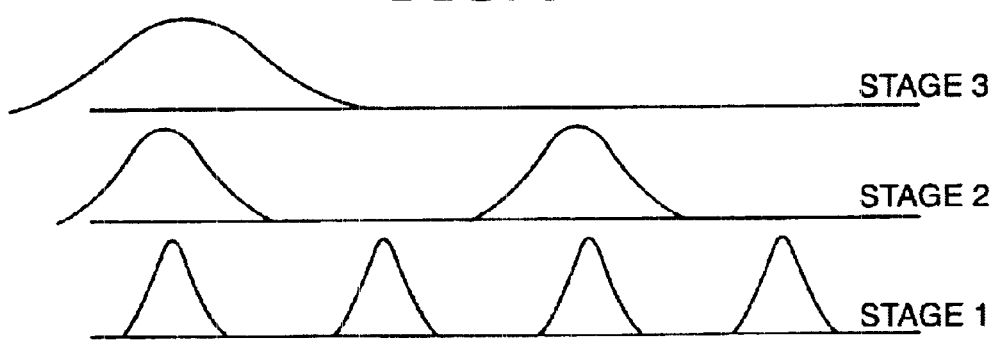
FIG. 6 are plots showing relative FSR and linewidth characteristics of the resonators depicted in FIG. 4.

Referring to FIG. 6, stage 1 represents the relative FSR and linewidth characteristics of the first resonator 1004; stage 2 represents the relative FSR and linewidths of the secondary resonators 1008, 1010; and stage 3 represents the relative FSR and linewidth characteristics of the tertiary resonators 1016, 1018, 1020, 1022. As a result, in contrast to the prior art, the finesses of all of the resonators does not have to change throughout the device 1000 and can be maintained at relatively low levels. As the FSR increases from an earlier stage to a later stage, so does the linewidth. As adjacent channels are filtered out, the linewidth required can be relaxed. In fact, the ratio of FSR over linewidth, i.e., the finesse, will remain constant at a relatively low value. This is depicted in Table 1 in which possible FSR and linewidth relationships for the aforementioned three stages, with the finesse being constantly held at the value 4 are depicted:

TABLE 1

| Stage | FSR | Linewidth | Finesse |
| --- | --- | --- | --- |
| 1 | $2\Delta\lambda$ | $0.5\Delta\lambda$ | 4 |
| 2 | $4\Delta\lambda$ | $\Delta\lambda$ | 4 |
| 3 | $8\Delta\lambda$ | $2\Delta\lambda$ | 4 |

Advantageously, the subject invention does not require high finesse values, thereby avoiding high manufacturing requirements.

It will be understood by those skilled in the art that the FSR of the first resonator 1004 may be other even multiples of the channel spacing of the input waveguide 1002. Also, the FSR characteristics of the first, secondary, and tertiary resonators may be of other even multiples.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A demultiplexing device for selectively demultiplexing a multi-channel light signal having a channel spacing characteristic, said device comprising:

a first waveguide;

a second waveguide;

a first resonator disposed between said first waveguide and said second waveguide, said first resonator defining a first free spectral range;

a third waveguide; and, a second resonator disposed between said second waveguide and said third waveguide, said second resonator defining a second free spectral range, said second free spectral range being an even multiple of said first free spectral range to divide said multi-channel light signal into a second signal and a third signal, said second signal and said third signal having a channel spacing, said channel spacing of said second signal being the same as the channel spacing of said third signal.

2. A device as in claim 1 further comprising a fourth waveguide and a third resonator, said third resonator being disposed between said first waveguide and said fourth waveguide, said third resonator defining a third free spectral range, said third free spectral range being an even multiple of said first free spectral range.

3. A device as in claim 2, wherein said third free spectral range is equal to said second free spectral range.

4. A device as in claim 2, wherein a first optical path is defined along said first waveguide between said first resonator and said third resonator, a second optical path is defined along said second waveguide between said first resonator and said second resonator, said second optical path being longer than said first optical path.

5. A device as in claim 1, wherein said first free spectral range is approximately two times the channel spacing characteristic of the multi-channel light signal.

6. A device as in claim 1, wherein said second free spectral range is approximately two times said first free spectral range.

7. A demultiplexing device for selectively demultiplexing a multi-channel light signal, said device comprising:
 a first waveguide;
 a second waveguide;
 a first resonator disposed between said first waveguide and said second waveguide, said first resonator being formed with a radius;
 a third waveguide; and,
 a second resonator disposed between said second waveguide and said third waveguide, said second resonator being formed with a second radius, said first radius being an even multiple of said second radius to divide said multi-channel light signal, into a second signal and a third signal, said second signal and third signal having a channel spacing, said channel spacing of said second signal being the same as the channel spacing of said third signal.

8. A device as in claim 7 further comprising a fourth waveguide and a third resonator, said third resonator being disposed between said first waveguide and said fourth waveguide, said third resonator having a third radius, said first radius being an even multiple of said third radius.

9. A device as in claim 8, wherein said third radius is equal to said second radius.

10. A device as in claim 8, wherein a first optical path is defined along said first waveguide between said first resonator and said third resonator, a second optical path is defined along said second waveguide between said first resonator and said second resonator, said second optical path being longer than said first optical path.

11. A device as in claim 7, wherein said multi-channel light signal includes channels and channel spacing between said channels, said first resonator has a free spectral range approximately two times said channel spacing of the light signal.

12. A device as in claim 7, wherein said first radius is approximately two times said second radius.

13. An optical demultiplexer for demultiplexing a multi-channel light signal, said demultiplexer comprising:
 a first demultiplexing stage comprising:
  a first stage input waveguide;
  a first stage output waveguide; and
  a first stage resonator having a first radius defining a first free spectral range and being optically coupled to said first stage input waveguide and said first stage output waveguide, said first stage having a first finesse value; and
 a second demultiplexing stage comprising:
  a quantity of second stage resonators equal to an even integer multiple of the number of resonators in said first stage, each of said second stage resonators having a second radius such that each of said second stage resonators defining a second free spectral range that is an even integer multiple of said first free spectral range, said second stage having a second finesse value approximately equal to said first finesse value; and
  a second stage output waveguide optically coupled to each of said second stage resonators;
  said first stage input waveguide providing an input to a first resonator of said second stage, and said first stage output waveguide providing an input to a second resonator of said second stage;
 each resonator in said first and said second stages coupling one-half the number of channels in the multi-channel light signal from its respective input waveguide and to its respective output waveguide.

14. An optical demultiplexer as in claim 13, wherein the even integer multiple is 2.

15. An optical demultiplexer as in claim 13, wherein said first radius is approximately equal to 160 microns and the first stage free spectral range is approximately equal to 100 GHz.

* * * * *